Patented Oct. 30, 1945

2,388,038

UNITED STATES PATENT OFFICE 2,388,038

VEHICLE STEERING MECHANISM

Thomas Henry Briggs and Walter Henry Briggs, Birmingham, England, assignors to Burman & Sons Limited, Birmingham, England Application May 22, 1944, Serial No. 536,802
In Great Britain September 16, 1943

1 Claim. (Cl. 74—499)

This invention relates to vehicle steering mechanisms by which motion can be transmitted to linkage associated with the steerable road wheels from a rotary shaft operable by the driver, through a unit of the kind comprising a screw rotatable by the said shaft, a slidable member operable by the screw, and a lever engaging the slidable member.

The object of the present invention is to provide an improved unit of the kind aforesaid.

In the accompanying sheets of explanatory drawings—

Figure 1 is a part sectional side elevation of a part of a unit constructed in accordance with the invention for use in a vehicle steering mechanism.

Figures 2 and 3 are sections taken on the lines 2—2 and 3—3 of Figure 1.

Figure 1:
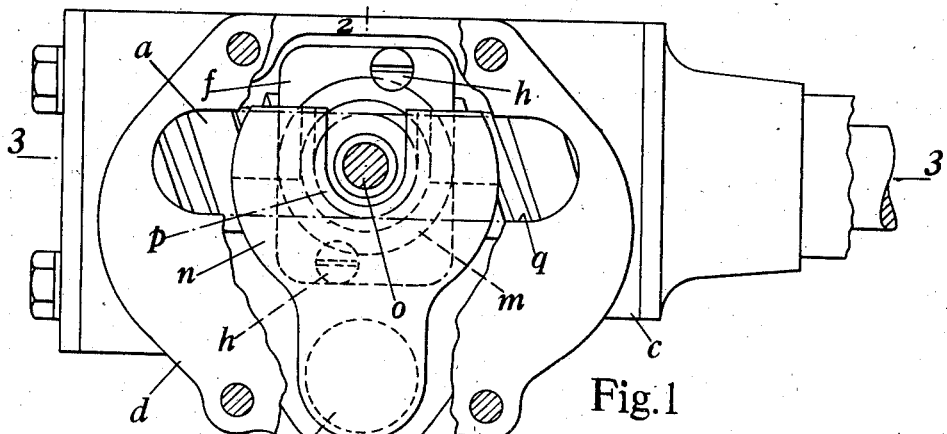
Figure 2:
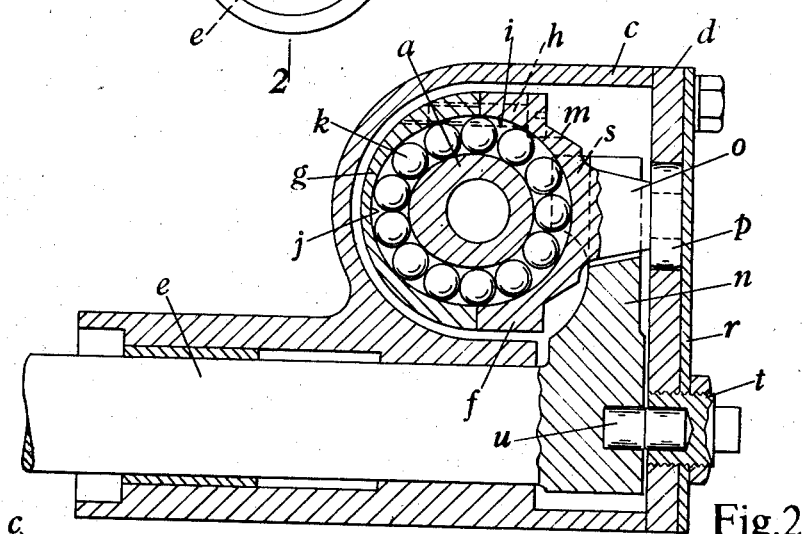
Figure 3:
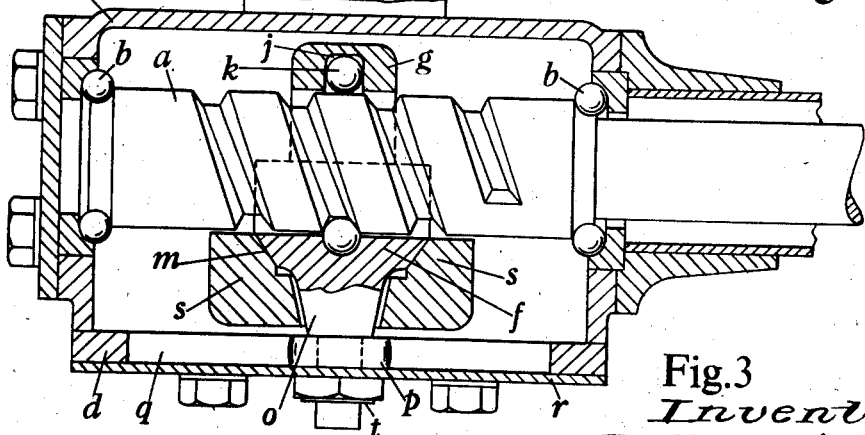

In carrying the invention into effect as shown in Figures 1 to 3, we employ a suitable screw $a$ which is formed on or adapted to be secured to one end of the driver's steering shaft, and is supported at its ends by ball or roller bearings as $b$ in an appropriate housing $c$. One side of the housing $c$ parallel with the axis of the screw $a$ consists of a detachable cover $d$ to be hereinafter referred to, and another part of the housing is adapted to support a shaft $e$ (herein termed the driven shaft) at right angles to the axis of the screw.

Mounted on the screw $a$ is a slidable but non-rotatable nut consisting of two parts $f$, $g$ which respectively embrace opposite halves of the screw, and which are secured together by screws $h$. The nut part $f$ (herein termed the operative nut part) is formed with a helical groove $i$ corresponding in shape to the adjacent portion of the helical groove of the screw $a$. The other nut part $g$ (herein termed the inoperative nut part) is formed with a groove $j$ adapted to interconnect the two ends of the groove $i$ in the operative nut part $f$ and to serve as a return path for a single ring of balls $k$ which occupy the grooves in the nut $f$, $g$ and screw $a$ and serve to effect the operative connection between them.

On one side of the operative nut part $f$ is formed a narrow boss $m$, the periphery of which is of truncated conical form. The mean diameter of the boss $m$ and the inclination of its peripheral surface are such that a line drawn normal to that surface at the position of mean diameter will pass through or near the centre of gravity of the operative portion of the nut part $f$. This condition obviates the imposition of undesirable forces on the nut $f$, $g$ and the lever $n$ (hereinafter described) when the mechanism is in action.

From the boss $m$ extends a stem $o$ which at its outer end carries a roller $p$ or slide block, the axis of the stem being a continuation of a diametrical line through the axis of the screw $a$, and the roller or slide being movable along a longitudinal guide slot $q$ in the cover $d$ above mentioned. It will be seen therefore that the cover $d$ serves also as a guide by which the end of the stem $o$ remote from the nut $f$, $g$ is slidably supported. The outer side of the guide slot $q$ in the cover $d$ is closed by a plate $r$ secured on the outer side of the cover.

Interconnection of the nut $f$, $g$ and the driven shaft $e$ is effected by the lever $n$ which is formed on or secured to one end of the driven shaft. The end of the lever $n$ remote from the driven shaft $e$ is forked to accommodate the stem $o$ on the operative nut part $f$, and at one side of the forked end are formed a pair of projections $s$ having inner inclined faces which bear against and are complementary to the inclination of the peripheral surface of the boss $m$ above-mentioned, these projections serving to effect the required connection between the nut $f$, $g$ and the lever.

Adjustment of the mechanism above described for the elimination of slackness between the contacting parts of the screw $a$, nut $f$, $g$ and lever $n$ is effected by a screw-threaded thrust piece $t$ carried by the cover $d$ and arranged coaxially with the driven shaft $e$, the said piece being adapted to exert (either directly or through an intermediate ball or roller $u$) endwise pressure on the driven shaft.

Figure 4:
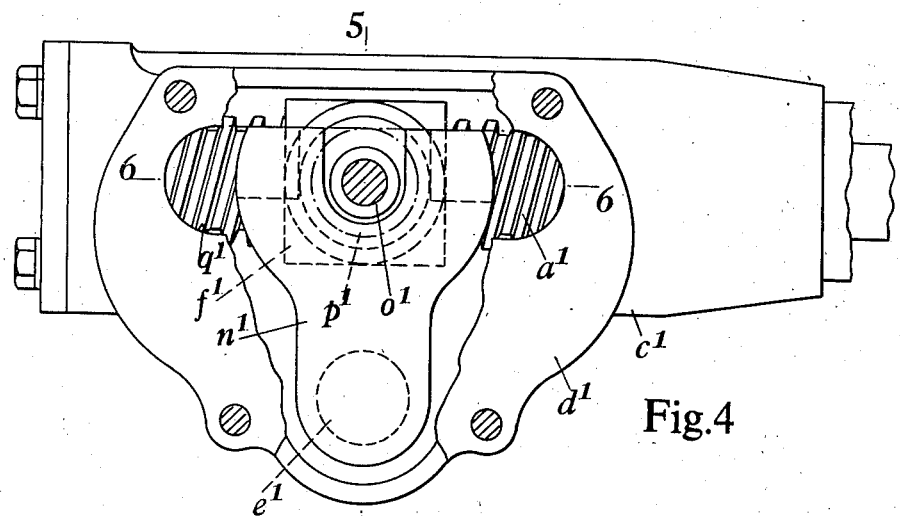
Figure 4 is a similar view to Figure 1 illustrating a modified form of the invention.
Figure 5:
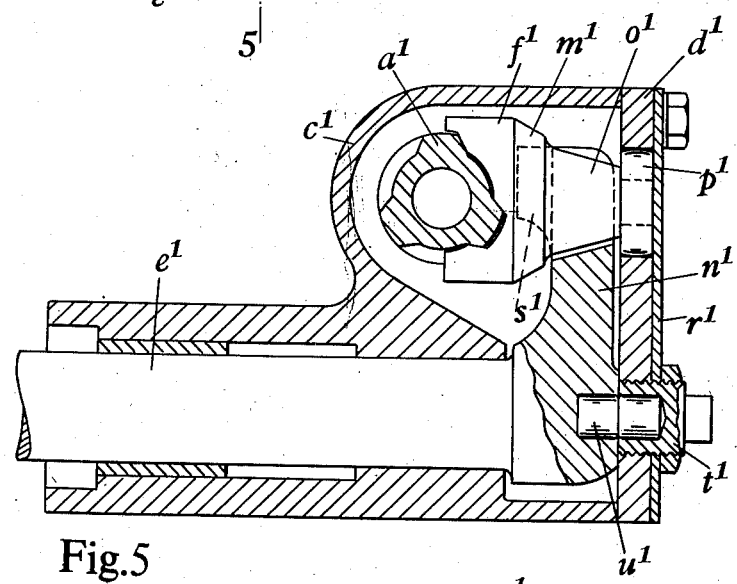
Figure 5 is a section on the line 5—5 of Figure 4.
Figure 6:
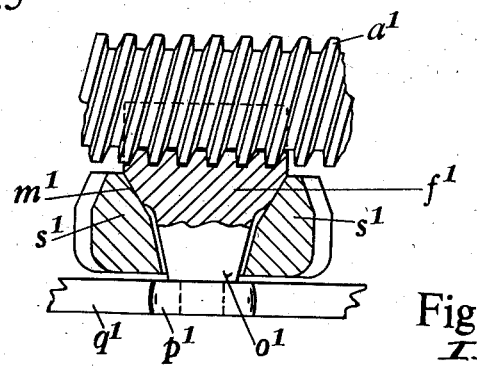
Figure 6 is a fragmentary section taken on the line 6—6 of Figure 4.

Instead of employing a nut which is operatively connected with the screw through the medium of a ring of balls as above described, we may employ a nut or an equivalent half-nut which directly engages the screw, an example of this modification being shown in Figures 4 to 6 in which parts similar to those above described are indicated by the same reference characters suffixed by 1. In this example we employ a half-nut $f^1$ formed with a screw thread which is complementary to and directly engages that of the screw $a^1$, this half-nut being formed with a narrow boss $m^1$ and a stem $o^1$ as in the previously described example. The mean diameter of the boss $m^1$ and the inclination of its peripheral surface are such that a line drawn normal to that surface at the position of mean diameter will pass through or near the centre of gravity of the operative portion of the half-nut $f^1$. In other respects the example shown in Figures 4 to 6 is essentially similar to that shown in Figures 1 to 3.

By this invention we are able to provide a high-efficiency unit in a very compact form, and also enable economy to be effected in manufacture both as regards labour and material.

Having thus described our invention what we claim as new and desire to secure by Letters Patent is:

A unit of the kind specified, comprising the combination of a rotatable screw, a slidable member operable by the screw, a stem extending from one side of the slidable member, a guide slidably supporting the end of the stem remote from the slidable member, a shaft having its axis at right angles to the axis of the screw, and a forked lever interconnecting the shaft and slidable member, the latter and the lever being provided respectively with and interengaged through the medium of a conical surface and complementary inclined surfaces, and the said conical surface being of such diameter and inclination that a line normal to the surface at the position of mean diameter passes through the region of the centre of gravity of the operative part of the slidable member.

THOMAS HENRY BRIGGS.
WALTER HENRY BRIGGS.